(12) United States Patent
Deng (10) Patent No.: US 10,146,750 B2
(45) Date of Patent: Dec. 4, 2018

(54) METHOD, APPARATUS, TERMINAL, AND STORAGE MEDIUM FOR IMAGE PROCESSING

(71) Applicant: TENCENT TECHNOLOGY (SHENZHEN) COMPANY LIMITED, Shenzhen (CN)

(72) Inventor: Xiaofeng Deng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 238 days.

(21) Appl. No.: 14/737,625

(22) Filed: Jun. 12, 2015

(65) Prior Publication Data
US 2015/0278173 A1    Oct. 1, 2015

Related U.S. Application Data (63) Continuation of application No. PCT/CN2013/087791, filed on Nov. 25, 2013.

(30) Foreign Application Priority Data

Dec. 14, 2012 (CN) .......................... 2012 1 0544230

(51) Int. Cl.
*G06F 17/00* (2006.01)
*G06F 17/22* (2006.01)
(Continued)

(52) U.S. Cl.
CPC .... *G06F 17/2247* (2013.01); *G06F 17/30265* (2013.01); *G06F 17/30876* (2013.01); *G06F 17/30887* (2013.01); *H04L 67/02* (2013.01)

(58) Field of Classification Search
CPC .............. H04L 67/02; G06F 17/30887; G06F 17/30265; G06F 17/2247; G06F 17/30876
See application file for complete search history.

(56) References Cited

U.S. PATENT DOCUMENTS

| 2003/0028543 A1* | 2/2003 | Dusberger ........ G06F 17/30244 |
| 2003/0118100 A1* | 6/2003 | Honda ................... H04N 19/61 375/240.08 |

(Continued)

FOREIGN PATENT DOCUMENTS

| CN | 101193074 A | 6/2008 |
| CN | 101359336 A | 2/2009 |

(Continued)

OTHER PUBLICATIONS

The State Intellectual Property Office of the People's Republic of China (SIPO) Office Action 1 for 201210544230.5 dated Sep. 12, 2016 pp. 1-8.

(Continued)

*Primary Examiner* — Scott T Baderman
*Assistant Examiner* — Matthew G McVicker
(74) *Attorney, Agent, or Firm* — Anova Law Group, PLLC (57) ABSTRACT

Disclosed is an image processing method, including: acquiring a Uniform Resource Locator (URL) of an image having a preset format; receiving a scripting language instruction sent by a server, and computing, according to the URL of the image having the preset format, a first URL of a first display image (e.g., a small image) and a second URL of a second display image (e.g., large image); displaying, according to the first URL of the first display image, the first display image when a display instruction of the first display image is triggered; and displaying, according to the second URL of the second display image, the second display image when a display instruction of the second display image is triggered. In the present disclosure, an image is correctly displayed through automatic adaptation to address algorithms of the small image and the corresponding large image, so that data traffic is reduced.

20 Claims, 3 Drawing Sheets

(51) Int. Cl.
*G06F 17/30* (2006.01)
*H04L 29/08* (2006.01)

(56) References Cited

U.S. PATENT DOCUMENTS

| | | | | |
|---|---|---|---|---|
| 2003/0171977 | A1* | 9/2003 | Singh | G06Q 20/20 |
| | | | | 709/217 |
| 2004/0003117 | A1* | 1/2004 | McCoy | A63B 53/04 |
| | | | | 709/246 |
| 2004/0225647 | A1* | 11/2004 | Connelly | G06F 17/30864 |
| 2005/0080876 | A1* | 4/2005 | Peiffer | G06F 17/30899 |
| | | | | 709/217 |
| 2006/0242163 | A1 | 10/2006 | Miller et al. | |
| 2006/0265225 | A1* | 11/2006 | Ichnowski | G10L 15/26 |
| | | | | 704/257 |
| 2007/0177818 | A1* | 8/2007 | Teshima | G06K 9/2054 |
| | | | | 382/276 |
| 2010/0115396 | A1* | 5/2010 | Byron | G06F 17/30873 |
| | | | | 715/234 |
| 2010/0211651 | A1* | 8/2010 | Guedalia | H04L 65/601 |
| | | | | 709/217 |
| 2012/0066586 | A1* | 3/2012 | Shemesh | G06F 17/30902 |
| | | | | 715/235 |

FOREIGN PATENT DOCUMENTS

| | | |
|---|---|---|
| CN | 102253942 A | 11/2011 |
| CN | 102651001 A | 8/2012 |

OTHER PUBLICATIONS

The World Intellectual Property Organization (WIPO) International Search Report for PCT/CN2013/087791 dated Mar. 6, 2014.

\* cited by examiner

METHOD, APPARATUS, TERMINAL, AND STORAGE MEDIUM FOR IMAGE PROCESSING

RELATED APPLICATION

This application is a continuation of PCT Application No. PCT/CN2013/087791, filed on Nov. 25, 2013, which claims priority to Chinese Patent Application No. 2012105442305, filed on Dec. 14, 2012, the entire content of all of which is incorporated by reference.

FIELD OF THE TECHNOLOGY

The present disclosure generally relates to the field of mobile terminal technologies, and more particularly, relates to a method, apparatus, terminal, and storage medium for image processing.

BACKGROUND OF THE DISCLOSURE

When an image is previewed on a terminal by using a web browser, a small image is usually previewed first. By clicking on the small image, a corresponding large image may be shown for viewing.

There are two common processing methods for viewing a large image corresponding to a small image. In one method, addresses of a large image and a small image are both downloaded to a local terminal, the small image is first acquired to be displayed, and the large image is directly acquired to be displayed when the large image is clicked on. Because the large image and the small image are both downloaded to the local terminal, in this method, a large amount of unnecessary traffic is consumed. In the other method, a Uniform Resource Locator (URL) of an image address is acquired, addresses of a small image and a large image are obtained through computation according to a particular algorithm, and the small image and the large image are separately acquired to be displayed.

However, when there is a change in the computation method of acquiring the address of the large image according to the address of the small image, the terminal cannot automatically adapt to the change in the algorithm, and in this case, the large image cannot be normally displayed on the terminal.

SUMMARY

Embodiments of the present invention provide a method, apparatus, terminal, and storage medium for image processing, where an image is correctly displayed through automatic adaptation to address algorithms of a small image and a corresponding large image, so as to reduce data traffic.

An embodiment of the present invention discloses an image processing method, including the following steps:
acquiring a URL of an image having a preset format;
receiving a scripting language instruction sent by a server, and computing, according to the URL of the image having the preset format, a first URL of a first display image and a second URL of a second display image;
displaying, according to the first URL of the first display image, the first display image when a display instruction of the first display image is triggered; and
displaying, according to the second URL of the second display image, the second display image when a display instruction of the second display image is triggered.

An embodiment of the present invention further discloses an image processing apparatus, including:
an image information acquiring module, configured to acquire a URL of an image having a preset format; and receive a scripting language instruction sent by a server, and compute, according to the URL of the image having the preset format, a first URL of a first display image and a second URL of a second display image; and
an image display module, configured to display, according to the first URL of the first display image, the first display image when a display instruction of the first display image is triggered; and display, according to the second URL of the second display image, the second display image when a display instruction of the second display image is triggered.

An embodiment of the present invention further discloses a non-transitory computer readable storage medium including a computer readable program stored thereon. When being executed, the computer readable program causes one or more processors to implement an image processing method, including the following steps:
acquiring a URL of an image having a preset format;
receiving a scripting language instruction sent by a server, and computing, according to the URL of the image having the preset format, a first URL of a first display image and a second URL of a second display image;
displaying, according to the first URL of the first display image, the first display image when a display instruction of the first display image is triggered; and
displaying, according to the second URL of the second display image, the second display image when a display instruction of the second display image is triggered.

In the method of the preset disclosure, a URL of an image having a preset format is acquired; a scripting language instruction sent by a server is received, and a first URL of a first display image and a second URL of a second display image are computed according to the URL of the image having the preset format; the first display image is displayed according to the first URL of the first display image when a display instruction of the first display image is triggered; and the second display image is displayed according to the second URL of the second display image when a display instruction of the second display image is triggered. The method has a beneficial effect of correctly displaying an image through automatic adaptation to address algorithms of the first display image and the corresponding second display image, so as to reduce data traffic.

Achievement of objectives, functional features, and advantages of the present disclosure are further described with reference to the embodiments and the accompanying drawings.

DESCRIPTION OF EMBODIMENTS

The following further describes the technical solutions of the present disclosure with reference to the accompanying drawings of the specification and specific embodiments. It should be understood that the specific embodiments described herein are only used to explain the present disclosure, rather than to limit the present disclosure.

In the disclosed method, apparatus, terminal, and storage medium for image processing of the present disclosure, a first display image is generally a small image, and a second display image is generally a large image.

On a terminal, during use of some related applications, corresponding application images need to be viewed. For example, when accessing to a network by using a browser, corresponding content of an image is usually displayed as a small image on a currently visited webpage. When a large image corresponding to the image needs to be viewed, the small image is clicked on, and the large image corresponding to the small image can be displayed for viewing. This often happens, for example, when viewing a microblog or social networking page, when previewing photos in an album, or when browsing an online mall.

Various embodiments provide a method, apparatus, terminal, and storage medium for image processing. For ease of description, a small image is refer to as a first display image, and a large image is refer to as a second display image.

Figure 1:
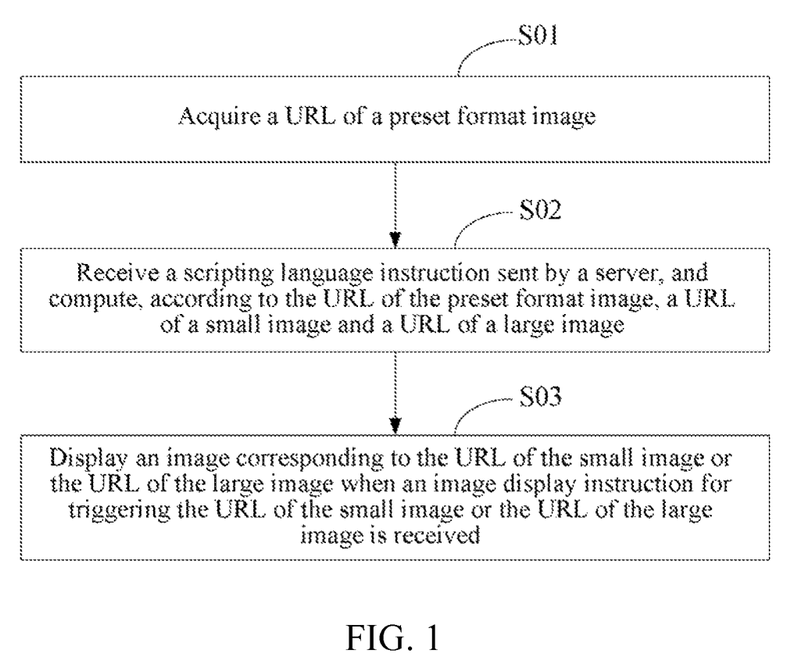
FIG. 1 illustrates a schematic flowchart of an embodiment of an image processing method according to the present disclosure.

Referring to FIG. 1, FIG. 1 illustrates a schematic flowchart of an embodiment of an image processing method according to the present disclosure. As shown in FIG. 1, the image processing method of the present disclosure includes the following steps:

Step S01: Acquiring a URL of an image having a preset format.

When an image needs to be displayed, a terminal automatically retrieves a URL of an image having a preset format that is prestored, where the URL of the image having the preset format is a URL of an image in an editable script format and can be considered as a user-defined pseudocode executed according to the script format, and the pseudocode includes a script engine keyword set and a corresponding grammar rule.

Correspondingly, the URL of an image in an editable script format can be considered as a URL of an image in an intermediate format between the small image and the large image, and the URL of the image merely includes a necessary parameter for computing a URL of a small image and a URL of a corresponding large image of the image. In this way, the terminal avoids unnecessary traffic caused by downloading of both the URL of the small image and the URL of the large image. At the same time, the URL of an image in an editable script format is also an important parameter for the terminal to automatically adapt to different algorithms of acquiring the URL of the large image by means of the URL of the small image. The necessary parameter for computing the URL of the small image and the URL of the corresponding large image of the image is determined by the terminal according to a specific application scenario.

According to different application scenarios, the necessary parameter of the URL of the small image and the URL of the corresponding large image determined by the terminal may be different. For example, when a URL of a corresponding large image is acquired by means of a URL of a small image on an album page, only an algorithm of acquiring the URL of the large image by means of the URL of the small image, a keyword of the URL of the small image, and a size parameter of the small image need to be determined. When a URL of a corresponding large image is acquired by means of a URL of a small image on a browser page, only an algorithm of acquiring the URL of the large image by means of the URL of the small image, a domain name rule, and a size parameter of the small image need to be determined.

Step S02: Receiving a scripting language instruction sent by a server, and compute, according to the URL of the image having the preset format, a URL of a small image and a URL of a large image.

The server sends, according to a grammar rule corresponding to the URL of the image having the preset format, the scripting language instruction to the terminal, and triggers the terminal to acquire the corresponding URL of the small image and URL of the large image.

The terminal receives the scripting language instruction sent by the server, directly acquires, according to the URL of the image having the preset format, the URL of the small image, and acquires, after the URL of the small image is acquired, according to the algorithm, of acquiring the URL of the corresponding large image by means of the URL of the small image, obtained through translation of the scripting language instruction, the URL of the large image corresponding to the small image. A process that the terminal acquires, according to a corresponding algorithm, the URL of the large image by means of the URL of the small image is that:

The terminal parses the scripting language instruction and acquires the script engine keyword set and the corresponding grammar rule. Because the scripting language instruction is sent by the server according to the grammar rule in the URL of the image having the preset format and in accordance with the algorithm of acquiring the URL of the corresponding large image by means of the URL of the small image, the terminal can parse the scripting language instruction to obtain the currently applied algorithm of acquiring the URL of the corresponding large image by means of the URL of the small image, and obtain through computation, according to the acquired corresponding algorithm, the URL of the large image by means of the URL of the small image.

For example, the terminal acquires keywords S1, S2, S3, and S4 corresponding to the URL of the small image in the script engine keyword set by parsing the scripting language instruction sent by the server. The algorithm of obtaining the URL of the large image by means of the URL of the small image is that: keywords of the URL of the large image that correspond to the keywords S1, S2, S3, and S4 of the URL of the small image are B1, B2, B3, and B4, respectively, where B1=S1*80+2, B2=S2/6+53*50, B3=(S1+S4)*70, and B4=(S1+S2+S3+S4)*30−100. The terminal obtains the keywords B1, B2, B3, and B4 of the URL of the large image through computation according to the keywords S1, S2, S3, and S4 of the URL of the small image and in accordance with the corresponding algorithm. The URL of the large image can be acquired by replacing the keywords S1, S2, S3, and S4 of the URL of the small image with the keywords B1, B2, B3, and B4 of the URL of the large image, respectively.

A person skilled in the art may understand that the algorithm of acquiring the URL of the corresponding large image by means of the URL of the small image is merely exemplary, and cannot be used as the only basis for the algorithm of acquiring the URL of the corresponding large image by means of the URL of the small image. A specific algorithm of acquiring the URL of the corresponding large image by means of the URL of the small image is not limited in this embodiment of the present invention.

In some embodiments, when a storage directory of an address of a large image of an image on the server is changed, related software on the terminal do not need to be updated; instead, the server only needs to send, according to the grammar rule, a different scripting language instruction, and the terminal can acquire a correct URL of a large image corresponding to the image by receiving and parsing the scripting language instruction.

A person skilled in the art may understand that because the scripting language instruction is sent by the server according to the currently applied algorithm of acquiring the URL of the corresponding large image by means of the URL of the small image, and the URL of an image retrieved by the terminal is also in the editable script format, the terminal can adapt to the algorithm of acquiring the URL of the large image by means of the URL of the small image to acquire the URL of the small image and the URL of the large image corresponding to the URL of the small image.

Step S03: Displaying an image corresponding to the URL of the small image or the URL of the large image when an image display instruction for triggering the URL of the small image or the URL of the large image is received.

When the image needs to be displayed in the form of a small image, the terminal acquires the URL of the small image to display the small image; and when the image needs to be displayed in the form of a large image, the terminal acquires the URL of the large image to display the corresponding large image.

For example, if a user is interested in a currently previewed image, but the current image is not displayed in the form of a large image, and the user wants to view a large image corresponding to the image, the image display instruction corresponding to the large image is triggered on the terminal when the user directly clicks on the current image. In this case, the terminal acquires, according to the image display instruction corresponding to the large image, the URL of the large image corresponding to the image to display the corresponding large image to be viewed by the user. When the user wants to return to a current interface to continue to view other images, the image display instruction corresponding to the small image is triggered on the terminal when the user clicks on the current large image. In this case, the terminal acquires, according to the image display instruction corresponding to the small image, the URL of the small image corresponding to the image to display the corresponding small image.

The terminal may also directly display the corresponding large image on the interface according to a specific application scenario and according to the URL of the large image corresponding to the image. For example, when a particular image needs to be applied on a desktop of the terminal or set as a screensaver image of the terminal, the terminal directly displays, according to the URL of the large image corresponding to the image, the corresponding large image on the interface.

In the method of this embodiment, a URL of an image having a preset format is acquired; a scripting language instruction sent by a server is received, and a URL of a small image and a URL of a large image are acquired according to the URL of the image having the preset format when an image is displayed; and a corresponding image is displayed according to the URL of the small image or the URL of the large image when an image display instruction is triggered. The method has a beneficial effect of correctly displaying an image through automatic adaptation to address algorithms of the small image and the corresponding large image, so as to reduce data traffic; moreover, the method also has an advantage of reducing the number of network interactions, thereby shortening the time of acquiring the URL of the large image.

Figure 2:
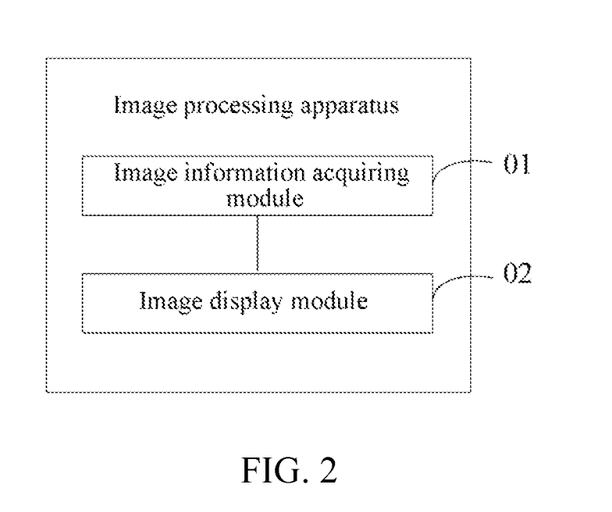
FIG. 2 illustrates a schematic structural diagram of an embodiment of an image processing apparatus according to the present disclosure

Referring to FIG. 2, FIG. 2 illustrates a schematic structural diagram of an embodiment of an image processing apparatus according to the present disclosure. As shown in FIG. 2, the image processing apparatus of the present disclosure includes: an image information acquiring module 01 and/or an image display module 02.

The image information acquiring module 01 is configured to acquire a URL of an image having a preset format; and receive a scripting language instruction sent by a server, and compute, according to the URL of the image having the preset format, a URL of a small image and a URL of a large image.

When an image needs to be displayed, the image information acquiring module 01 automatically retrieves a URL of an image having a preset format that is prestored, where the URL of the image having the preset format is a URL of an image in an editable script format and can be considered as a user-defined pseudocode executed according to the script format, and the pseudocode includes a script engine keyword set and a corresponding grammar rule. Correspondingly, the URL of an image in an editable script format can be considered as a URL of an image in an intermediate format between the small image and the large image, and the URL of the image merely includes a necessary parameter for computing a URL of a small image and a URL of a corresponding large image of the image. In this way, unnecessary traffic caused by downloading of both the URL of the small image and the URL of the large image is avoided. At the same time, the URL of an image in an editable script format is also an important parameter for the image processing apparatus of the present disclosure to automatically adapt to different algorithms of acquiring the URL of the large image by means of the URL of the small image. The necessary parameter for computing the URL of the small image and the URL of the corresponding large image of the image is determined by the terminal according to a specific application scenario.

According to different application scenarios, the necessary parameter of the URL of the small image and the URL of the corresponding large image determined by the image information acquiring module 01 may be different. For example, when a URL of a corresponding large image is acquired by means of a URL of a small image on an album page, the image information acquiring module 01 only needs to determine an algorithm of acquiring the URL of the large image by means of the URL of the small image, a keyword of the URL of the small image, and a size parameter of the small image. When a URL of a corresponding large image is acquired by means of a URL of a small image on a browser page, the image information acquiring module 01 only needs to determine an algorithm of acquiring the URL of the large image by means of the URL of the small image, a domain name rule, and a size parameter of the small image.

The server sends, according to a grammar rule corresponding to the URL of the image having the preset format, the scripting language instruction to the terminal, and triggers the terminal to acquire the corresponding URL of the small image and URL of the large image.

The image information acquiring module 01 receives the scripting language instruction sent by the server, directly acquires, according to the URL of the image having the preset format, the URL of the small image, and acquires, after the URL of the small image is acquired, according to the algorithm, of acquiring the URL of the corresponding large image by means of the URL of the small image, obtained through translation of the scripting language instruction, the URL of the large image corresponding to the small image. A process that the image information acquiring module 01 acquires, according to a corresponding algorithm, the URL of the large image by means of the URL of the small image is that:

The image information acquiring module 01 parses the scripting language instruction and acquires the script engine keyword set and the corresponding grammar rule. Because the scripting language instruction is sent by the server according to the grammar rule in the URL of the image having the preset format and in accordance with the algorithm of acquiring the URL of the corresponding large image by means of the URL of the small image, the image information acquiring module 01 can parse the scripting language instruction to obtain the currently applied algorithm of acquiring the URL of the corresponding large image by means of the URL of the small image, and obtain through computation, according to the acquired corresponding algorithm, the URL of the large image by means of the URL of the small image.

For example, the image information acquiring module 01 acquires keywords S1, S2, S3, and S4 corresponding to the URL of the small image in the script engine keyword set by parsing the scripting language instruction sent by the server. The algorithm of obtaining the URL of the large image by means of the URL of the small image is that: keywords of the URL of the large image that correspond to the keywords S1, S2, S3, and S4 of the URL of the small image are B1, B2, B3, and B4, respectively, where B1=S1*80+2, B2=S2/6+53*50, B3=(S1+S4)*70, and B4=(S1+S2+S3+S4)*30−100. The image information acquiring module 01 obtains the keywords B1, B2, B3, and B4 of the URL of the large image through computation according to the keywords S1, S2, S3, and S4 of the URL of the small image and in accordance with the corresponding algorithm. The URL of the large image can be acquired by replacing the keywords S1, S2, S3, and S4 of the URL of the small image with the keywords B1, B2, B3, and B4 of the URL of the large image, respectively.

A person skilled in the art may understand that the algorithm of acquiring the URL of the corresponding large image by means of the URL of the small image is merely exemplary, and cannot be used as the only basis for the algorithm of acquiring the URL of the corresponding large image by means of the URL of the small image. A specific algorithm of acquiring the URL of the corresponding large image by means of the URL of the small image is not limited in this embodiment of the present invention.

In some embodiments, when a storage directory of an address of a large image of an image on the server is changed, related software on the image processing apparatus do not need to be updated; instead, the server only needs to send, according to the grammar rule, a different scripting language instruction, and the image information acquisition module 01 can acquire a correct URL of a large image corresponding to the image by receiving and parsing the scripting language instruction.

A person skilled in the art may understand that because the scripting language instruction is sent by the server according to the currently applied algorithm of acquiring the URL of the corresponding large image by means of the URL of the small image, and the URL of an image retrieved by the image information acquiring module 01 is also in the editable script format, the image processing apparatus of the present disclosure can adapt to the algorithm of acquiring the URL of the large image by means of the URL of the small image to acquire the URL of the small image and the URL of the corresponding large image.

The image display module 02 is configured to display an image corresponding to the URL of the small image or the URL of the large image when an image display instruction for triggering the URL of the small image or the URL of the large image is received.

When the image needs to be displayed in the form of a small image, the image display module 02 acquires the URL of the small image to display the small image; and when the image needs to be displayed in the form of a large image, the image display module 02 acquires the URL of the large image to display the corresponding large image.

For example, if a user is interested in a currently previewed image, but the current image is not displayed in the form of a large image, and the user wants to view a large image corresponding to the image, the image display instruction corresponding to the large image is triggered on the terminal when the user directly clicks the current image. In this case, the image display module 02 acquires, according to the image display instruction corresponding to the large image, the URL of the large image corresponding to the image to display the corresponding large image to be viewed by the user. When the user wants to return to a current interface to continue to view other images, the image display instruction corresponding to the small image is triggered on the terminal when the user clicks the current large image. In this case, the image display module 02 acquires, according to the image display instruction corresponding to the small image, the URL of the small image corresponding to the image to display the corresponding small image.

The image display module 02 may also directly display the corresponding large image on the interface according to a specific application scenario and according to the URL of the large image corresponding to the image. For example, when a particular image needs to be applied on a desktop of the terminal or set as a screensaver image of the terminal, the image display module 02 directly displays, according to the URL of the large image corresponding to the image, the corresponding large image on the interface.

In this embodiment, a URL of an image having a preset format is acquired; a scripting language instruction sent by a server is received, and a URL of a small image and a URL of a large image are computed according to the URL of the image having the preset format; and an image corresponding to the URL of the small image or the URL of the large image is displayed when an image display instruction for triggering the URL of the small image or the URL of the large image is received. The method has the beneficial effect of correctly displaying images by using an adaptive address algorithm of the small image and the corresponding large image, which reduces data traffic; and simultaneously, the method also has the advantage of reducing the number of network interactions, thereby shortening the time of acquiring the URL of the large image.

Figure 3:
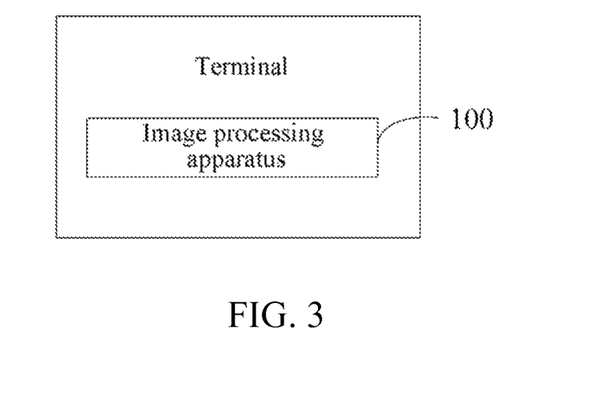
FIG. 3 illustrates a schematic structural diagram of an embodiment of a terminal according to the present disclosure.

Referring to FIG. 3, FIG. 3 illustrates a schematic structural diagram of an embodiment of a terminal according to the present disclosure. As shown in FIG. 3, the terminal of the present disclosure includes the image processing apparatus 100. Reference is made to specific description of the embodiment in FIG. 2 for the description of the image processing apparatus 100.

The terminal may be a mobile terminal such as a smart phone or a tablet computer, or may also be a terminal such as a personal computer (PC). When the image processing apparatus 100 runs on the mobile terminal, a beneficial effect becomes especially significant, and this is related to network traffic of the mobile terminal and a rate of interactions with a mobile network. For example, the terminal may be a computing device as shown in FIG. 4, capable of implementing the disclosed methods, consistent with the disclosed embodiments.

Figure 4:
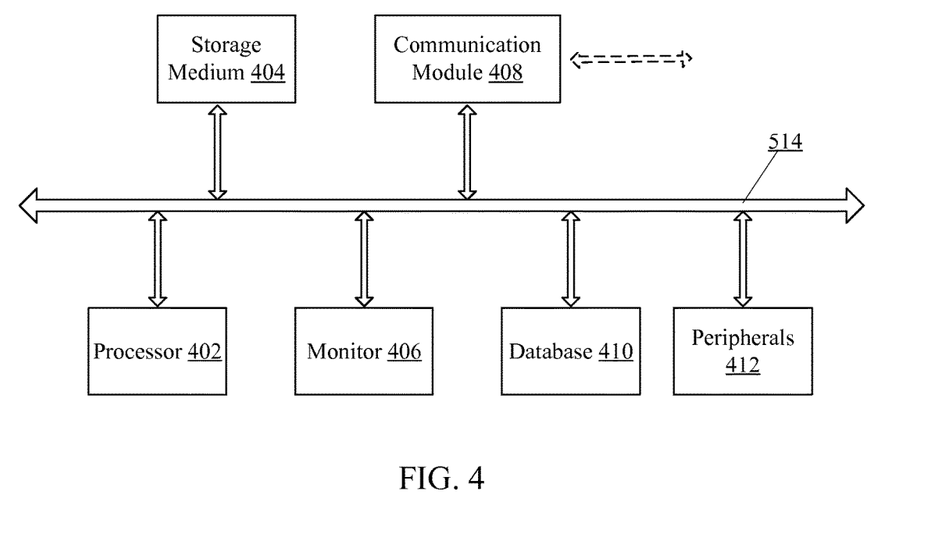
FIG. 4 illustrates an exemplary computing device consistent with the disclosed embodiments.

As shown in FIG. 4, the exemplary computing device 400 may include a processor 402, a storage medium 404, a monitor 406, a communication module 408, a database 410, peripherals 412, and one or more bus 414 to couple the devices together. Certain devices may be omitted and other devices may be included.

Processor 402 may include any appropriate processor or processors. Further, processor 402 may include multiple cores for multi-thread or parallel processing. The processor 402 may be used to run computer program(s) stored in the storage medium 404. Storage medium 404 may include memory modules, such as ROM, RAM, and flash memory modules, and mass storages, such as CD-ROM, U-disk, removable hard disk, etc. Storage medium 404 may store computer programs for implementing various disclosed processes, when executed by processor 402. In one embodiment, storage medium 404 may be a non-transient computer-readable storage medium having a computer program stored thereon, when being executed, to cause the computer to implement the disclosed methods.

Further, peripherals 412 may include I/O devices such as keyboard and mouse, and communication module 408 may include network devices for establishing connections, e.g., through a communication network such as the Internet. Database 410 may include one or more databases for storing certain data and for performing certain operations on the stored data, such as webpage browsing, database searching, etc.

In one embodiment, the disclosed image processing apparatus may include the computing device illustrated in FIG. 4. For example, the image processing apparatus may include one or more processors and a non-transitory computer-readable storage medium having instructions/programs stored thereon, the instructions/programs executed by the one or more processors and including the modules and units disclosed in the image processing apparatus.

In this embodiment, the terminal acquires a URL of an image having a preset format; receives a scripting language instruction sent by a server, and computes, according to the URL of the image having the preset format, a URL of a small image and a URL of a large image; and displays an image corresponding to the URL of the small image or the URL of the large image when an image display instruction for triggering the URL of the small image or the URL of the large image is received. The method has the beneficial effect of correctly displaying images by using an adaptive address algorithm of the small image and the corresponding large image, which reduces data traffic; and simultaneously, the method also has the advantage of reducing the number of network interactions, thereby shortening the time of acquiring the URL of the large image.

The foregoing descriptions are merely preferred embodiments of the present invention but are not intended to limit the patent scope of the present disclosure. Any equivalent modifications made to the structures or processes based on the content of the specification and the accompanying drawings of the present disclosure for direct or indirect use in other related technical fields shall also fall within the patent protection scope of the present disclosure.

What is claimed is:

1. An image processing method, comprising:
    acquiring a Uniform Resource Locator (URL) of an image having a preset format, wherein content of the image is displayed as a first display image or a second display image, and the URL of the image having the preset format is in an editable script format and comprises a script engine keyword set including keywords that correspond to a URL of the first display image;
    receiving a scripting language instruction sent by a server to acquire the URL of the first display image, wherein the scripting language instruction is sent according to the URL of the image having the preset format and in accordance with an algorithm of acquiring a URL of the second display image from the URL of the first display image;
    parsing the scripting language instruction to acquire the keywords included in the script engine keyword set that correspond to the URL of first display image and the algorithm of acquiring the URL of the second display image from the URL of the first display image;
    computing, according to the keywords included in the script engine keyword set and the algorithm of acquiring the URL of the second display image from the URL of the first display image, the URL of the second display image;
    displaying, according to the URL of the first display image, the first display image when a display instruction of the first display image is triggered;
    displaying, according to the URL of the second display image, the second display image when a display instruction of the second display image is triggered; and
    in response to a change in a storage directory of an address of the second display image at the server, receiving and parsing a new scripting language instruction sent by the server to automatically acquire a new URL of the second display image.

2. The method according to claim 1, wherein the URL of the image having the preset format further comprises:
    a grammar rule of the URL of the first display image.

3. The method according to claim 1, wherein the URL of the image having the preset format comprises:
    a size parameter of the URL of the first display image.

4. The method according to claim 1, wherein a grammar rule of the scripting language instruction is consistent with a grammar rule of the URL of the image having the preset format.

5. The method according to claim 1, wherein computing, according to the one or more keywords included in the script engine keyword set and the algorithm of acquiring the URL of the second display image from the URL of the first display image, the URL of the second display image further comprises:
    for each of the one or more keywords in the script engine keyword set that correspond to the URL of the first display image, calculating a corresponding keyword by an equation; and
    replacing each of the one or more keywords in the script engine keyword set that correspond to the URL of the first display image with the corresponding keyword, respectively, to acquire the URL of the second display image.

6. The method according to claim 2, wherein a grammar rule of the scripting language instruction is consistent with a grammar rule of the URL of the image having the preset format.

7. The method according to claim 3, wherein a grammar rule of the scripting language instruction is consistent with a grammar rule of the URL of the image having the preset format.

8. The method according to claim 5, wherein:
for different keywords included in the one or more keywords in the script engine keyword set, different equations are used to calculate the corresponding keywords.

9. The method according to claim 8, wherein:
the one or more keywords in the script engine keyword set includes a first keyword S1, a second keyword S2, a third keyword S3, and a fourth keyword S4;
a first equation based on the first keyword S1 is configured to calculate a corresponding keyword B1 of the first keyword S1;
a second equation based on the first keyword S1 and the second keyword S2 is configured to calculate a corresponding keyword B2 of the second keyword S2;
a third equation based on the first keyword S1, the second keyword S2, and the third keyword S3, is configured to calculate a corresponding keyword B3 of the third keyword S3; and
a fourth equation based on the first keyword S1, the second keyword S2, the third keyword S3, and the fourth keyword S4, is configured to calculate a correspondingly keyword B4 of the fourth keyword S4,
wherein:
the first equation is $B1=S1*80+2$, the second equation is $B2=S2/6+S3*50$, the third equation is $B3=(S1+S4)*70$, and the fourth equation is $B4=(S1+S2+S3+S4)*30-100$.

10. An image processing apparatus, comprising at least one or more processors configured to:
acquire a Uniform Resource Locator (URL) of an image- having a preset format, wherein content of the image is displayed as a first display image or a second display image, and the URL of the image having the preset format is in an editable script format and comprises a script engine keyword set including keywords corresponding to a URL of the first display image;
receive a scripting language instruction sent by a server to acquire the URL of the first display image, wherein the scripting language instruction is sent according to the URL of the image having the preset format and in accordance with an algorithm of acquiring a URL of the second display image from the URL of the first display image;
parsing the scripting language instruction to acquire the keywords included in the script engine keyword set that correspond to the URL of first display image and the algorithm of acquiring the URL of the second display image from the URL of the first display image;
computing, according to the keywords included in the script engine algorithm of acquiring the URL of the second display image from the URL of the first display image, the URL of the second display image;
display, according to the URL of the first display image, the first display image when a display instruction of the first display image is triggered;
display, according to the URL of the second display image, the second display image when a display instruction of the second display image is triggered; and
in response to a change in a storage directory of an address of the second display image at the server, receive and parse a new scripting language instruction to automatically acquires a new URL of the second display image.

11. The apparatus according to claim 10, wherein the URL of the image having the preset format further comprises a grammar rule of the URL of the first display image.

12. The apparatus according to claim 10, wherein the URL of the image having the preset format comprises a size parameter of the URL of the first display image.

13. The apparatus according to claim 10, wherein a grammar rule of the scripting language instruction is consistent with a grammar rule of the URL of the image having the preset format.

14. The apparatus according to claim 11, wherein a grammar rule of the scripting language instruction is consistent with a grammar rule of the URL of the image having the preset format.

15. The apparatus according to claim 12, wherein a grammar rule of the scripting language instruction is consistent with a grammar rule of the URL of the image having the preset format.

16. A non-transitory computer readable storage medium comprising a computer readable program stored thereon, wherein, when being executed, the computer readable program causes one or more processors to implement an image processing method, the method comprising:
acquiring a Uniform Resource Locator (URL) of an image-having a preset format, wherein content of the image is displayed as a first display image or a second display image, and the URL of the image having the preset format is in an editable script format and comprises a script engine keyword set including keywords corresponding to a URL of the first display image;
receiving a scripting language instruction sent by a server to acquire the URL of the first display image, wherein the scripting language instruction is sent according to the URL of the image having the preset format and in accordance with an algorithm of acquiring a URL of the second display image from the URL of the first display image;
parsing the scripting language instruction to acquire the keywords included in the script engine keyword set that correspond to the URL of first display image and the algorithm of acquiring the URL of the second display image from the URL of the first display image;
displaying, according to the URL of the first display image, the first display image when a display instruction of the first display image is triggered;
displaying, according to the URL of the second display image, the second display image when a display instruction of the second display image is triggered; and
in response to a change in a storage directory of an address of the second display image at the server, receiving and parsing a new scripting language instruction sent by the server to automatically acquire a new URL of the second display image.

17. The storage medium according to claim 16, wherein the URL of the image having the preset format further comprises:
a grammar rule of the URL of the first display image.

18. The storage medium according to claim 16, wherein the URL of the image having the preset format comprises:
a size parameter of the URL of the first display image.

19. The storage medium according to claim 17, wherein a grammar rule of the scripting language instruction is consistent with a grammar rule of the URL of the image having the preset format.

20. The storage medium according to claim 18, wherein a grammar rule of the scripting language instruction is consistent with a grammar rule of the URL of the image having the preset format.

* * * * *